Sept. 8, 1964 C. K. BROWN 3,147,663
EXPLOSIVE NUT RETAINER
Filed Sept. 14, 1961
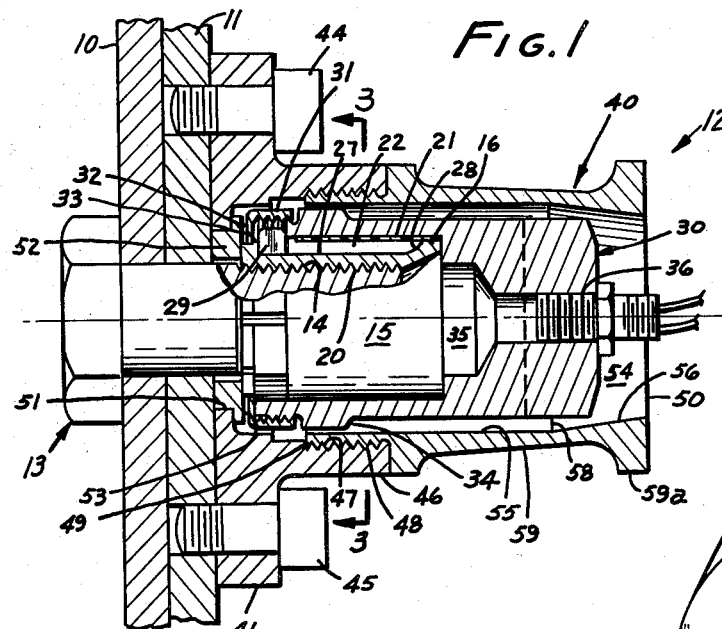
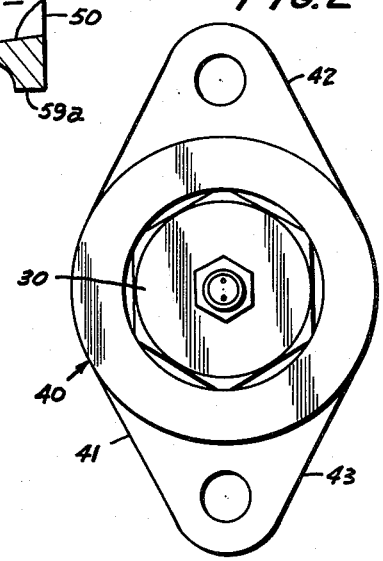
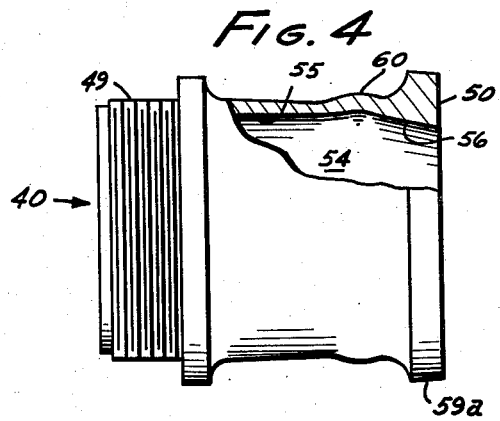
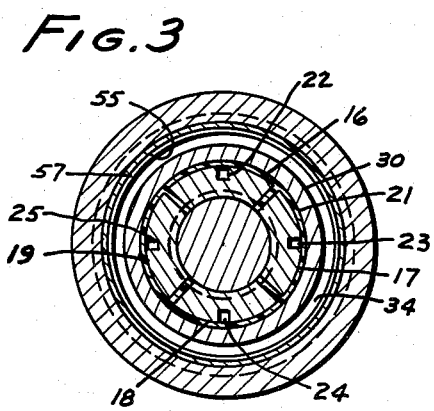
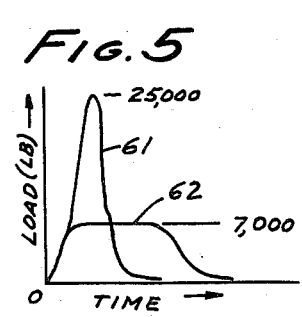
INVENTOR.
CLARENCE K. BROWN
BY
Angus & Mon
ATTORNEYS.

United States Patent Office 3,147,663
Patented Sept. 8, 1964

3,147,663
EXPLOSIVE NUT RETAINER
Clarence K. Brown, Long Beach, Calif., assignor to Hi-Shear Corporation, Torrance, Calif., a corporation of California
Filed Sept. 14, 1961, Ser. No. 138,088
5 Claims. (Cl. 85—33)

This invention relates to an explosively separable fastener and in particular to housing means for caging the loose parts which are developed by the explosive separation.

Explosively separable fasteners, such as explosive nuts, are well known in the art. One known type includes a segmented nut adapted to engage the thread of another fastener element, such as a bolt. The segments are held together by a holder element, such as a cylindrical piston-type device, which is blown off the segments by an explosive charge to free the segments from the threads they engage and thereby separate the fastener.

There are many applications for explosive fasteners where it is permissible to scatter their parts upon separation. For example, the separation may take place inside a test cell, or perhaps over the ocean where the falling parts will not harm persons or property. There are also many applications in which flying parts are potentially dangerous. For example, in missile stage separations, flying parts might even damage the missile itself. For such application it is necessary to provide a cage or some other type of housing to retain the pieces.

It is known to provide cages in the nature of boxes, but these have had to be made heavy because they have acted merely as a wall against which the flying pieces impinge. This construction must be strong enough to withstand the high peak loads of such impacts, and also the attachment means for attaching the housing to surrounding structure must be commensurately heavy. For installations in which weight is a penalty, the bulk and mass of such housings are a disadvantage.

It is an object of this invention to provide an explosively separable fastener which includes a housing which serves to retain the parts after separation and which also serves to arrest the moving pieces in such a manner as to convert at least a part of their kinetic energy into deformation of the housing, thereby reducing the peak loads which must be carried by the housing and by the attachment means which are used to hold the housing to adjacent structure. This substantially reduces the required weight and strength of the housing and of the attachment means.

An explosively separable fastener according to this invention includes a first and a second fastener element which may, for example, be a bolt element and a nut element, respectively. The nut element may conveniently be comprised of a group of separable or separate segments surrounded and sometimes held together by a holder element. An explosive charge is provided for blowing the holder element off of the second fastener element, thereby releasing the segments from the first fastener element.

A housing according to this invention comprises a body adapted to be attached to surrounding structure, ordinarily to one of the bodies joined together by the fastener. The housing body has a cavity defined by an internal wall. The wall includes an inwardly tapered portion engageable by a portion of the holder element after the holder element is shot off the second fastener element. The tapered wall is adapted to be deformed by the element when the holder element is shot against this internal wall, thereby converting at least a portion of the kinetic energy of the holder element into deformation of the housing material, and thereby reducing the peak loads exerted on the housing.

According to a preferred but optional feature of the invention, the material of the housing where the deformation takes place has a yield strength not greater than about two-thirds of the ultimate tensile strength of the material.

According to still another preferred but optional feature of the invention, a reinforcing ring is provided on the housing body on the opposite side of the tapered portion from the holder element.

The above and other features of this invention will be fully understood from the following detailed description and the accompanying drawings in which:

FIG. 1 is a view principally in cutaway cross-section showing the presently preferred embodiments of the invention;

FIG. 2 is a right-hand view of FIG. 1;

FIG. 3 is a cross-section taken at line 3—3 of FIG. 1;

FIG. 4 is a side elevation partly in cutaway cross-section of the housing element of the device of FIG. 1 after it has arrested a holder element; and FIG. 5 is a graph showing the comparison of the performance of device of FIG. 1 with the performance of devices known in the prior art.

In FIG. 1 there is shown the presently preferred embodiment of the invention. It is shown joining together bodies 10 and 11 which may be two adjacent plates or ends of a strap. After explosive separation, bodies 10 and 11 will be separable in the sense that the fastener no longer holds them together. The fastener assembly 12 includes a first fastener element 13 which may, for example, be a headed bolt with thread 14, and a second fastener element 15 in the nature of a nut.

Fastener element 15, as best shown in FIGS. 1 and 3, includes four grooved segments 16, 17, 18, 19, which, when assembled in a ring, form a continuous thread 20 which is engageable by thread 14.

A band 21, which may be made of nylon or some other readily-cut material, usually a plastic, holds the segments together with their grooves aligned to form thread 20.

Segments 16, 17, 18, 19 have external axially extending grooves 22, 23, 24, 25, respectively, which grooves extend parallel to axis 26 of the assembly. These grooves have flat bottoms, such as bottom 27, and sloping cam surfaces, such as cam surface 28, both shown in groove 22.

A key, such as key 29, shown in groove 22 is provided for each groove. Each is adapted to slide along the flat bottom of its respective groove, strike the respective cam surface to cam up the left-hand end of the segment, with respect to directions in FIG. 1, and press down the right-hand ends of the segments.

A holder element 30 surrounds the second fastener element and is slidedly fitted thereon in fluid-sealing relationship, the adjacent surfaces being circularly cylindrical and closely fitted to provide the seal. A keeper 31 is threaded onto the left-hand end of the holder element, and includes an overhanging shoulder 32 which overhangs the keys and also a small rim 33 on the segments.

A peripheral shoulder 34 is formed on the outside of the holder element.

When the first fastener element is threaded into the second fastener element, it closes the left-hand end of an expansion chamber 35 in the holder element. The other end of the chamber is closed by an explosive squib 36 which is adapted, when fired, to discharge gaseous explosion products into the expansion chamber. The effect of firing the squib is to move the holder element to the right and the second fastener element relatively to the left with reference to FIG. 1. The first fastener element closes the hole formed by the segments while the first and second fastener elements are engaged.

A housing 40 is provided to trap the parts of the second fastener element when the device is fired. It includes a housing base 41 with ears 42, 43, the ears having holes therethrough for passing bolts or studs 44, 45 to hold the housing to body 11. The base has a neck 46 with internal threads 47 for receiving external threads 48 on a projection 49 of a housing end piece 50. A central opening 51 in the base passes the shank of the first fastener element. An insert ring 52 in the opening includes a face 53 against which the segments bear. Face 53 is made harder than the segments so that when they are tightened down against the ring, they will not dig into it. If they could dig into it, the release of the segments might be retarded.

The housing defines an internal cavity 54 which is bounded by an internal wall with a cylindrical portion 55 and a tapered portion 56. There is an annular clearance 57 between peripheral shoulder 34 and the cylindrical portion. The cylindrical and tapered portions join at junction 58.

At least a part of the tapered portion has a diameter smaller than that of the peripheral shoulder and is adapted to be engaged by the peripheral shoulder when the fastener is explosively separated. The included conical angle of the tapered portion is preferably about 14° or less so as to form a locking fit with the housing member after separation of the fastener elements. A groove 59 is formed in the outside of the housing end piece to reduce its weight and facilitate deformation of the wall as described below. A safety ring 59a extends around the end of the end piece to form a reinforced portion that assures no part will be shot out of the housing.

The housing end piece, particularly in the tapered portion, is preferably made of material whose yield strength is about two-thirds or less of the ultimate tensile strength of the material so that it will be deformed readily and will not tend to crack. The wall thickness of the tapered section is selected with regard to the forces to be absorbed.

The assembly and operation of the device will now be described. The housing base is first attached to body 11 by bolts or studs as shown. The assembled second fastener element with its holder element on it is then threaded on to fastener element 13, thereby joining bodies 10 and 11. Second fastener element 15 is threaded down tight against the hardened insert. The fastener is then firmly set. The housing end piece is next threaded on to the housing base and the unit is installed.

When bodies 10 and 11 are to be separated, the squib is fired, discharging gaseous products of the explosion into cavity 51. This blows the holder element to the right and the fastener elements to the left with reference to FIG. 1, along axis 26. All elements of the device are centered on axis 26, and axis 26 is also the firing direction. As the holder element and fastener elements make their relative motion, the overhanging shoulder 32 of the keeper bends to pass over the holder element, but the overhanging shoulder is strong enough that it backs up keys 29 and forces them to move along the grooves, cutting the material of the band as they go. When the keys reach the sloping cam surfaces in the segment grooves, they press the right-hand ends of the segments downward and left-hand ends of the segments move upward and away from the thread of fastener element 13. This frees the two fastener elements, and the two bodies can move apart. Often they will be spring assisted so that the separation of the bodies is positive. The cylindrical portion 55 of the cavity is long enough that the above described separation of fastener elements occurs before peripheral shoulder 34 strikes the surface of tapered portion 53. At this moment, the holder element has a considerable kinetic energy and is approaching the tapered surface at a considerable velocity. In conventional cages, the holder member has been arrested by its slamming directly against an end wall, resulting in high impact loads. However, in the device according to the invention, there is a gradually-increasing engagement between the wall and the holder member, and a concurrent distortion of the wall, such distortion being indicated by numeral 60 in FIG. 4. This distortion dissipates considerable energy and, furthermore, because of the gradual tapered shape, the dissipation of the energy takes place over an appreciable length of time for such processes. These features greatly minimize peak impact loads. It is to be understood, of course, not all energy is dissipated in this manner. Much must still be absorbed in the bolts or studs 44 and 45 and the attached body. However, in dissipating as much energy as possible in distortion of holder element material in the manner indicated greatly reduces weight and strength requirement for the attachment means and for wall material to accommodate the "stretch" of the holder element. Inasmuch as deformation of the holder element is desired for dissipating energy, the wall thickness of the holder element will be enough to ensure that cracking does not occur, but not so thick as to resist distortion. Also, the material used will be one which tends to deform rather than to crack. The material selected and the thickness of the wall of the tapered portion is a matter of design which is best determined empirically by testing. The dimensions for one successful embodiment are shown in the following table.

Dimensions in inches:
  Outer diameter shoulder 34: _____ 1.125
  Radius on edge of shoulder 34: _____ 0.062
  Length of cylindrical portion 55 in housing
    end piece: _____ 0.925
  Diameter of cylindrical portion 55, and of
    larger diameter of tapered portion 56: ____ 1.150
  Smaller diameter of tapered portion 56: ____ 1.015
  Axial length of tapered portion 56: _____ 0.606
  Wall thickness of tapered portion to left of
    outside radius at safety ring 59a: _____ .070–.075
  Taper angle of portion 56: _____ 13° included
  Outer diameter of safety ring 59a: _____ 1.500
  Axial length of safety ring 59a: _____ 0.125
Material: 2024S–T4 Aluminum alloy, per QQ–A–268.
Squib used: Hi-Shear Corporation part No. PC10.

In view of the fact that fracture of the material is undesirable, the material of construction at the point where distortion of the holder element is to take place is selected from one having the property that its yield stress is about two-thirds or less of its ultimate tensile stress. Many materials of construction fall into this category. For example, 2024S–T4 aluminium is suitable, as is mild steel, both of which function well for this purpose.

The safety ring is provided in the event that an extra-large charge in the squib might be too great for the tapered portion to resist. The strengthened end portion provided by the safety ring will serve to prevent the holder element from being shot through the open end of the housing.

The effectiveness of the housing is shown by the graph in FIG. 5. Graph 61 shows the load-time graph for one type of fastener, such as shown in FIG. 1, with the exception that instead of providing a tapered portion, the housing merely has a flat end wall normal to axis 26 into which the holder element slams. The peak load for graph 61 is approximately 25,000 lbs. and it will be recognized that this requires considerable housing wall thicknesses and strong attachment means to hold it to body 11. On the other hand, using the housing shown in FIG. 1 and the same type of fastener, reactions shown by graph line 62 occur, in which the peak load is only about 7,000 lbs. The work performed is indicated by the area under each of the curves and is of course the same, but the peak loads are drastically lessened, and the time the load is exerted is much longer on graph 62. Therefore, the attachment means and the housing structure can all be very much lighter using the present invention.

The combination of the fastener elements, holder, and housing described herein forms an effective explosively separable fastener assembly. However, the housing is useful with other types of fastener elements, with or without housings. It is useful wherever a shot-off article forming part of a fastener has an outer portion adapted to engage its tapered wall portion where energy is dissipated by distortion of the material. Therefore, even though the combination as shown is itself useful, it forms only an example of a broad range of uses of the housing to arrest shot-off portions of explosive fasteners.

The terms "distored" or "distortion" as used herein mean distortion of a permanent nature, where forces are exerted beyond the elastic limit of the housing material.

It will also be understood that the terms "fastener element" or "fastener" are not limited to threadedly-engaged types, but include separable fasteners of all types, such as rod engagements, ball detents, and cam locks, to name but a few. They all have in common that some element is explosively blown out of place to separate the fastener, and that the housing of FIG. 1 arrests that element.

The term "tapered" as used in connection with the tapered portion of the cavity is not limited to cones, but is intended to comprehend shapes which converge toward the axis toward the right in FIG. 1, and to exclude surfaces normal to the axis.

By keeping the conical angle of the tapered portion to 14° or less, the engagement between the holder element and the housing becomes a locking type, and the holder element is thereby firmly held. This is a further assistance in keeping the loose parts within the housing as they are all too large to pass through the hole in the insert in the housing base, and the holder element plugs the hole at the other end of the housing.

This invention is not to be limited by the example shown in the drawings and described in the description which is given by way of illustration and not of limitation, but only in accordance with the scope of the appended claims.

I claim:

1. An explosively-separable fastener assembly having an axis and adapted to join a first body to a second body, said assembly comprising: a first and a second fastener element, said fastener elements being joinable to hold the bodies together, and said second fastener element being releasable to separate from the first fastener element; an explosive charge; a holding element comprising means to hold the second fastener element to the first fastener element, and upon detonation of the charge, to move a distance axially away from the second fastener element in order to release the same; a peripheral shoulder on the holding element making a first angle relative to the axis; and a housing; means carried by said housing for attaching it to one of said bodies, said housing having an internal cavity in which the second fastener element and holding element are disposed, the cavity being bounded at least in part by an internal tapered wall on the housing which tapered wall makes a second angle with the axis, said second angle being smaller than the first angle, said tapered wall being axially spaced from the peripheral shoulder when the assembly is assembled, by a distance sufficient to permit the holding element to clear the second fastener element, the radii of the peripheral shoulder and tapered wall overlapping whereby they will make contact with each other when the explosive charge is detonated, thereby freeing the holding element from the second fastener element and moving it toward the tapered wall, the area of contact between the peripheral shoulder and the tapered wall progressively increasing as the peripheral shoulder moves into the tapered wall, whereby the housing at the overlapping portion of the tapered wall is radially deformed thus to dissipate in said deformation at least a part of the kinetic energy of the holding element after being fired.

2. An assembly according to claim 1 in which the housing includes an integral, external ring which increases the wall thickness of the housing at a location axially spaced from a least a portion of the tapered section and on the opposite side of that portion from the source of the holding element to limit the penetration of the housing by the holding element.

3. An assembly according to claim 1 in which that part of the housing which forms the portion of the wall to be deformed is made of a material whose yield point stress is less than about two-thirds of its ultimate tensile stress.

4. An assembly according to claim 1 in which the tapered wall is a cone with an included angle not greater than 14°.

5. An assembly according to claim 4 in which that part of the housing which forms the portion of the wall to be deformed is made of a material whose yield point stress is less than about two-thirds of its ultimate tensile stress.

References Cited in the file of this patent

UNITED STATES PATENTS

| | | |
|---|---|---|
| 1,539,057 | Ridderstrom | May 26, 1925 |
| 2,361,979 | Tarwater | Nov. 7, 1944 |
| 2,421,807 | Richey | June 10, 1947 |
| 2,497,084 | Irby | Feb. 14, 1950 |
| 2,924,147 | Bohl et al. | Feb. 9, 1960 |
| 3,030,996 | Doerr | Apr. 24, 1962 |
| 3,053,131 | Stott | Sept. 11, 1962 |